(12) United States Patent
Günther et al.

(10) Patent No.: US 11,731,361 B2
(45) Date of Patent: Aug. 22, 2023

(54) PROCESS AND APPARATUS FOR PRODUCING 3D MOLDINGS COMPRISING A SPECTRUM CONVERTER

(71) Applicant: Voxeljet AG, Friedberg (DE)

(72) Inventors: Daniel Günther, Munich (DE);
Christoph Scheck, Augsburg (DE);
Imre Bardos, Augsburg (DE)

(73) Assignee: VOXELJET AG, Friedberg (DE)

( * ) Notice: Subject to any disclaimer, the term of this patent is extended or adjusted under 35 U.S.C. 154(b) by 0 days.

(21) Appl. No.: 17/673,419

(22) Filed: Feb. 16, 2022

(65) Prior Publication Data

US 2022/0168956 A1 Jun. 2, 2022

Related U.S. Application Data

(62) Division of application No. 16/629,107, filed as application No. PCT/DE2018/000205 on Jul. 9, 2018, now Pat. No. 11,279,087.

(30) Foreign Application Priority Data

Jul. 21, 2017 (DE) ...................... 10 2017 006 860.7

(51) Int. Cl.
*B29C 64/153* (2017.01)
*B29C 64/286* (2017.01)
(Continued)

(52) U.S. Cl.
CPC .......... *B29C 64/286* (2017.08); *B29C 64/153* (2017.08); *B29C 64/165* (2017.08);
(Continued)

(58) Field of Classification Search
CPC ... B29C 64/153; B29C 64/165; B29C 64/286; G02B 5/208; B22F 10/28
See application file for complete search history.

(56) References Cited

U.S. PATENT DOCUMENTS 4,247,508 A 1/1981 Housholder
4,575,330 A 3/1986 Hull
(Continued)

FOREIGN PATENT DOCUMENTS

AU 720255 B2 5/2000
CN 101146666 A 3/2008
(Continued)

OTHER PUBLICATIONS

US 4,937,420 A, 06/1990, Deckard (withdrawn)
(Continued)

*Primary Examiner* — Atul P. Khare
(74) *Attorney, Agent, or Firm* — The Dobrusin Law Firm, P.C.

(57) ABSTRACT

A process and an apparatus for producing 3D moldings, wherein a spectrum converter is used. Said converter is defined as a means which absorbs a radiation, for example electromagnetic thermal radiation, and radiates or emits one or more defined wavelength ranges; the spectrum converter is here irradiated by an emitter of an electromagnetic thermal radiation (shortwave or longwave radiation), i.e. by a lamp or an emitter, for example an overhead emitter or a sintering unit, and then emits a defined electromagnetic thermal radiation.

19 Claims, 11 Drawing Sheets

(51) Int. Cl.
| | |
|---|---|
| *B29C 64/245* | (2017.01) |
| *B29C 64/295* | (2017.01) |
| *B29C 64/209* | (2017.01) |
| *B29C 64/165* | (2017.01) |
| *B29C 64/30* | (2017.01) |
| B33Y 10/00 | (2015.01) |
| B33Y 30/00 | (2015.01) |
| B29K 75/00 | (2006.01) |
| B29K 77/00 | (2006.01) |
| B22F 10/28 | (2021.01) |
| G02B 5/20 | (2006.01) |

(52) U.S. Cl.
CPC .......... *B29C 64/209* (2017.08); *B29C 64/245* (2017.08); *B29C 64/295* (2017.08); *B29C 64/30* (2017.08); B22F 10/28 (2021.01); B29K 2075/00 (2013.01); B29K 2077/00 (2013.01); B33Y 10/00 (2014.12); B33Y 30/00 (2014.12); G02B 5/208 (2013.01)

(56) References Cited

U.S. PATENT DOCUMENTS

| | | |
|---|---|---|
| 4,665,492 A | 5/1987 | Masters |
| 4,752,352 A | 6/1988 | Feygin |
| 4,752,498 A | 6/1988 | Fudim |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,059,266 A | 10/1991 | Yamane et al. |
| 5,120,476 A | 6/1992 | Scholz |
| 5,126,529 A | 6/1992 | Weiss et al. |
| 5,127,037 A | 6/1992 | Bynum |
| 5,134,569 A | 7/1992 | Masters |
| 5,136,515 A | 8/1992 | Helinski |
| 5,149,548 A | 9/1992 | Yamane et al. |
| 5,155,324 A | 10/1992 | Deckard et al. |
| 5,156,697 A | 10/1992 | Bourell et al. |
| 5,248,456 A | 8/1993 | Evans, Jr. et al. |
| 5,252,264 A | 10/1993 | Forderhase et al. |
| 5,284,695 A | 2/1994 | Barlow et al. |
| 5,342,919 A | 8/1994 | Dickens, Jr. et al. |
| 5,352,405 A | 10/1994 | Beaman et al. |
| 5,387,380 A | 2/1995 | Cima et al. |
| 5,398,193 A | 3/1995 | deAngelis |
| 5,503,785 A | 4/1996 | Crump et al. |
| 5,518,060 A | 5/1996 | Cleary et al. |
| 5,518,680 A | 5/1996 | Cima et al. |
| 5,555,176 A | 9/1996 | Menhennett et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,749,041 A | 5/1998 | Lakshminarayan et al. |
| 5,753,274 A | 5/1998 | Wilkening et al. |
| 5,824,250 A | 10/1998 | Whalen |
| 5,851,465 A | 12/1998 | Bredt |
| 5,884,688 A | 3/1999 | Hinton et al. |
| 5,902,537 A | 5/1999 | Almquist et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 6,048,188 A | 4/2000 | Hull et al. |
| 6,048,954 A | 4/2000 | Barlow et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,193,922 B1 | 2/2001 | Ederer |
| 6,210,625 B1 | 4/2001 | Matsushita |
| 6,217,816 B1 | 4/2001 | Tang |
| 6,243,616 B1 | 6/2001 | Droscher et al. |
| 6,259,962 B1 | 7/2001 | Gothait |
| 6,270,335 B2 | 8/2001 | Leyden et al. |
| 6,305,769 B1 | 10/2001 | Thayer et al. |
| 6,335,097 B1 | 1/2002 | Otsuka et al. |
| 6,375,874 B1 | 4/2002 | Russell et al. |
| 6,403,002 B1 | 6/2002 | Van Der Geest |
| 6,405,095 B1 | 6/2002 | Jang et al. |
| 6,423,255 B1 | 7/2002 | Hoechsmann et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,827,988 B2 | 12/2004 | Krause et al. |
| 6,830,643 B1 | 12/2004 | Hayes |
| 6,838,035 B1 | 1/2005 | Ederer et al. |
| 6,896,839 B2 | 5/2005 | Kubo et al. |
| 7,120,512 B2 | 10/2006 | Kramer et al. |
| 7,153,463 B2 | 12/2006 | Leuterer et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,455,805 B2 | 11/2008 | Oriakhi et al. |
| 7,497,977 B2 | 3/2009 | Nielsen et al. |
| 7,597,835 B2 | 10/2009 | Marsac |
| 7,641,461 B2 | 1/2010 | Khoshnevis |
| 7,790,096 B2 | 9/2010 | Merot et al. |
| 7,799,253 B2 | 9/2010 | Höschmann et al. |
| 7,879,282 B2 | 2/2011 | Hopkinson et al. |
| 8,186,415 B2 | 5/2012 | Marutani et al. |
| 8,574,485 B2 | 11/2013 | Kramer |
| 8,951,033 B2 | 2/2015 | Höchsmann et al. |
| 9,327,450 B2 | 5/2016 | Hein et al. |
| 9,643,359 B2 | 5/2017 | Baumann et al. |
| 10,642,023 B2 | 5/2020 | Hierro Domenech |
| 10,682,809 B2 | 6/2020 | Ederer |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0083771 A1 | 5/2003 | Schmidt |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0094058 A1 | 5/2004 | Kasperchik et al. |
| 2004/0112523 A1 | 6/2004 | Crom |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |

(56) References Cited

U.S. PATENT DOCUMENTS

| | | |
|---|---|---|
| 2005/0017394 A1 | 1/2005 | Hochsmann et al. |
| 2005/0074511 A1 | 4/2005 | Oriakhi et al. |
| 2005/0079086 A1 | 4/2005 | Farr |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0276976 A1 | 12/2005 | Pfeifer et al. |
| 2005/0280185 A1 | 12/2005 | Russell et al. |
| 2006/0012058 A1 | 1/2006 | Hasei |
| 2006/0103054 A1 | 5/2006 | Pfeifer et al. |
| 2006/0105102 A1 | 5/2006 | Hochsmann et al. |
| 2006/0159896 A1 | 7/2006 | Pfeifer et al. |
| 2006/0175346 A1 | 8/2006 | Ederer et al. |
| 2006/0208388 A1 | 9/2006 | Bredt et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni |
| 2007/0057412 A1 | 3/2007 | Weiskopf et al. |
| 2007/0126157 A1 | 6/2007 | Bredt |
| 2007/0238056 A1 | 10/2007 | Baumann et al. |
| 2007/0241482 A1 | 10/2007 | Giller et al. |
| 2008/0001331 A1 | 1/2008 | Ederer |
| 2008/0003390 A1 | 1/2008 | Hayashi |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0068376 A1 | 3/2009 | Philippi et al. |
| 2009/0206065 A1 | 8/2009 | Kruth |
| 2010/0007048 A1 | 1/2010 | Schweininger |
| 2010/0007062 A1 | 1/2010 | Larsson et al. |
| 2010/0207288 A1 | 8/2010 | Dini |
| 2010/0212584 A1 | 8/2010 | Ederer et al. |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2012/0046779 A1 | 2/2012 | Pax et al. |
| 2012/0097258 A1 | 4/2012 | Hartmann et al. |
| 2012/0113439 A1 | 5/2012 | Ederer et al. |
| 2012/0126457 A1 | 5/2012 | Abe et al. |
| 2012/0291701 A1 | 11/2012 | Grasegger et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2014/0048980 A1 | 2/2014 | Crump et al. |
| 2014/0065194 A1 | 3/2014 | Yoo |
| 2014/0212677 A1 | 7/2014 | Gnuchtel et al. |
| 2014/0227123 A1 | 8/2014 | Gunster |
| 2014/0271961 A1 | 9/2014 | Khoshnevis |
| 2014/0306379 A1 | 10/2014 | Hartmann et al. |
| 2015/0042018 A1 | 2/2015 | Gunther et al. |
| 2015/0110910 A1 | 4/2015 | Hartmann et al. |
| 2015/0224718 A1 | 8/2015 | Ederer et al. |
| 2015/0266238 A1 | 9/2015 | Ederer et al. |
| 2015/0268099 A1 | 9/2015 | Craig et al. |
| 2015/0273572 A1 | 10/2015 | Ederer et al. |
| 2015/0290881 A1 | 10/2015 | Ederer et al. |
| 2015/0375419 A1 | 12/2015 | Gunther et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2016/0318251 A1 | 11/2016 | Ederer et al. |
| 2017/0050378 A1 | 2/2017 | Ederer |
| 2017/0106595 A1 | 4/2017 | Gunther et al. |
| 2017/0113415 A1 | 4/2017 | Desimone et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0210037 A1 | 7/2017 | Ederer et al. |
| 2017/0297263 A1 | 10/2017 | Ederer et al. |
| 2017/0305139 A1 | 10/2017 | Hartmann |
| 2017/0355137 A1 | 12/2017 | Ederer et al. |
| 2018/0079133 A1 | 3/2018 | Ederer et al. |
| 2018/0141271 A1 | 5/2018 | Gunther et al. |
| 2018/0186075 A1* | 7/2018 | Hierro Domenech ........................ B29C 64/286 |
| 2018/0319082 A1* | 11/2018 | Barnes ................. B29C 64/165 |
| 2018/0326662 A1 | 11/2018 | Gunther et al. |
| 2018/0369910 A1 | 12/2018 | Gunther et al. |
| 2019/0047218 A1 | 2/2019 | Ederer et al. |
| 2019/0084229 A1 | 3/2019 | Gunther |
| 2020/0055246 A1 | 2/2020 | Gunther et al. |
| 2021/0206079 A1 | 7/2021 | Barnes |
| 2021/0291450 A1* | 9/2021 | Barnes ................. B33Y 30/00 |

FOREIGN PATENT DOCUMENTS

| | | | |
|---|---|---|---|
| DE | 3221357 A1 | 12/1983 | |
| DE | 3930750 C2 | 3/1991 | |
| DE | 4102260 A1 | 7/1992 | |
| DE | 4305201 C1 | 4/1994 | |
| DE | 4 325 573 A1 | 2/1995 | |
| DE | 29506204 U1 | 6/1995 | |
| DE | 4440397 | 9/1995 | |
| DE | 19530295 C1 | 1/1997 | |
| DE | 19528215 A1 | 2/1997 | |
| DE | 29701279 U1 | 5/1997 | |
| DE | 19545167 A1 | 6/1997 | |
| DE | 69031808 T2 | 4/1998 | |
| DE | 19853834 | 5/2000 | |
| DE | 69634921 T2 | 12/2005 | |
| DE | 201 22 639 U1 | 11/2006 | |
| DE | 102006040305 A1 | 3/2007 | |
| DE | 102006029298 A1 | 12/2007 | |
| DE | 102007040755 A1 | 3/2009 | |
| DE | 102007047326 A1 | 4/2009 | |
| DE | 102011053205 A1 | 3/2013 | |
| DE | 102014215218 A1 * | 2/2016 | ......... B29C 67/0066 |
| EP | 0361847 B1 | 4/1990 | |
| EP | 0431924 A2 | 6/1991 | |
| EP | 1415792 | 5/2004 | |
| EP | 1457590 A | 9/2004 | |
| EP | 1648686 A1 | 4/2006 | |
| EP | 1740367 B1 | 11/2009 | |
| EP | 2202016 A1 | 6/2010 | |
| GB | 2297516 A | 8/1996 | |
| GB | 2422344 A | 7/2006 | |
| JP | S62275734 A | 11/1987 | |
| JP | 2003/136605 A | 5/2003 | |
| JP | 2004/082206 A | 3/2004 | |
| JP | 2009/202451 A | 9/2009 | |
| WO | 90/03893 A1 | 4/1990 | |
| WO | 01/40866 A2 | 6/2001 | |
| WO | 2004/014637 A1 | 2/2004 | |
| WO | 2006/100166 A1 | 9/2006 | |
| WO | 2008/049384 A1 | 5/2008 | |
| WO | 2008/061520 A2 | 5/2008 | |
| WO | 2011/063786 A1 | 6/2011 | |
| WO | 2013/075696 A1 | 5/2013 | |
| WO | 2014/090207 A1 | 6/2014 | |
| WO | 2014/166469 A1 | 10/2014 | |

(56) References Cited

FOREIGN PATENT DOCUMENTS

WO     2016/019942 A1     2/2016
WO     2017/008777 A1     1/2017

OTHER PUBLICATIONS

International Search Report and Written Opinion, PCT Application No. PCT/DE2018/000205, dated Oct. 11, 2018.
International Preliminary Report on Patentability, PCT Application No. PCT/DE2018/000205, dated Jan. 21, 2020.
Marcus et al., Solid Freedom Fabrication Proceedings, Nov. 1993.
Cima et al., "Computer-derived Microstructures by 3D Printing: Bio- and Structural Materials," SFF Symposium, Austin, TX, 1994.
Marcus, et al., Solid Freeform Fabrication Proceedings, Sep. 1995, pp. 130-33.
Gebhart, Rapid Prototyping, pp. 118-119, 1996.
Feature Article—Rapid Tooling—Cast Resin and Sprayed Metal Tooling by Joel Segal, Apr. 2000.
EOS Operating Manual for Laser Sintering Machine with Brief Summary Feb. 22, 2005.
Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.
Sachs et al., "Three-Dimensional Printing: Rapid Tooling and Prototypes Directly from a CAD Model", Massachusetts Institute of Technology, pp. 143-151, Jan. 1990.
Williams, "Feasibility Study of Investment Casting Pattern Design by Means of Three Dimensional Printing", Department of Mechanical Engineering, abstract only; Sep. 25, 2001.
Armin Scharf, "Erster 3D-Endlosdrucker", zwomp.de, http://www.zwomp.de/2012/11/06/voxeljet-endlosdrucker/ dated Nov. 6, 2012.
Screen shots of URL: http://www.youtube.com/watch?v=hgIrNXZjIxU taken in approximately 5 second intervals on Nov. 12, 2015.
Jacobs et al., 2005 SME Technical Paper, title "Are QuickCast Patterns Suitable for Limited Production?".

* cited by examiner

PROCESS AND APPARATUS FOR PRODUCING 3D MOLDINGS COMPRISING A SPECTRUM CONVERTER

CLAIM OF PRIORITY

The present application is a divisional of U.S. patent application Ser. No. 16/629,107 filed on Jan. 7, 2020, which is a national phase of International (PCT) Patent Application PCT/DE2018/000205 filed on Jul. 9, 2018 and claims priority to German Patent Application DE 10 2017 006 860.7 on Jul. 21, 2017. This application claims priority to U.S. patent application Ser. No. 16/629,107, International Patent PCT/DE2018/000205, and German Patent Application Number DE 10 2017 006 860.7, and incorporates each by reference in its entirety.

The invention relates to a method and a device for producing three-dimensional models by means of a layer construction technique.

European Patent EP 0 431 924 B1 describes a process for producing three-dimensional objects based on computer data. In the process, a thin layer of particulate material is deposited on a platform and has a binder material selectively printed thereon by means of a print head. The particulate region with the binder printed thereon bonds and solidifies under the influence of the binder and, optionally, an additional hardener. Next, the platform is lowered by one layer thickness into a construction cylinder and provided with a new layer of particulate material, the latter also being printed on as described above. These steps are repeated until a certain desired height of the object is achieved. Thus, the printed and solidified regions form a three-dimensional object.

Upon completion, the object made of solidified particulate material is embedded in loose particulate material, from which it is subsequently freed. For this purpose, a suction device may be used, for example. This leaves the desired objects which then have to be freed from any residual powder, e.g. by brushing it off.

Other powder-based rapid prototyping processes (also referred to as layered construction of models or layer construction techniques), e.g. selective laser sintering or electron beam sintering, work in a similar manner, also applying loose particulate material layer by layer and selectively solidifying it with the help of a controlled physical source of radiation.

In the following, all these processes will be understood to be covered by the term "three-dimensional printing methods" or "3D printing methods".

3D printing on the basis of pulverulent materials and introduction of liquid binders is the quickest method among the layer construction techniques.

This method allows various particulate materials, including polymeric materials, to be processed. However, it has the disadvantage that the particulate material bed cannot exceed a certain bulk density, which is usually 60% of the particle density. The strength of the desired parts significantly depends on the achieved density, however. Insofar it would be required here for high strength of the parts to add 40% or more by volume of the particulate material in the form of liquid binder. This is not only a relatively time-consuming process due to the single-droplet input, but it also causes many process-related problems, which are given, for example, by the inevitable shrinkage of the liquid volume during solidification.

In another embodiment, which is known in the art as "high-speed sintering", solidification of the particulate material is effected by input of infrared radiation. The particulate material is thus bonded physically by a fusing process. In this case, advantage is taken of the comparatively poor absorption of thermal radiation in colorless plastic materials. Said absorption can be increased multiple times by introducing an IR acceptor (absorber) into the plastic material. The IR radiation can be introduced by various means, e.g. a bar-shaped IR lamp, which is moved evenly over the construction field. Selectivity is achieved by the specific printing of the respective layer with an IR acceptor.

In the printed locations, the IR radiation thereby couples much better into the particulate material than in the unprinted regions. This results in selective heating within the layer beyond the melting point and, consequently, to selective solidification. This process is described, for instance, in EP1740367B1 and EP1648686B1 and will be abbreviated below as HSS.

Various materials are known from the laser sintering process which can be processed with this method as well. By far the most important material in this context is polyamide 12. There are several manufacturers for this material. The strengths achieved are excellent for layer construction methods.

The material is available as a fine powder which can be processed directly in this quality. Due to the manufacturing process, however, costs are high and may exceed the cost of standard polyamide by a factor of 20-30.

In the high-speed sintering process according to the prior art, just as in laser sintering, the powder is brought to a temperature near the melting point of the material for processing. This causes the powder to "age" and limits its use in subsequent processes. A low recycling rate results, which has a negative effect on process costs.

The precision of the parts is significantly influenced by process control. Thus, the homogeneity of parameters such as powder bed density and temperature in the construction space is decisive.

The known high-speed sintering methods have a multitude of disadvantages concerning, on the one hand, the recycling rate and, on the other hand, process costs, consequently increasing the cost per piece and making it rather expensive. In particular, the aging of the powder is a crucial problem, and the resulting low recycling rate is a great hindrance for this process to become more widespread. Currently, approx. 50% of the unprinted powder has to be replaced after a process. At powder prices of approx. €80/kg and with construction volumes of several hundred liters, this requires high financial investments.

One approach to solving the process-related problems, thereby reducing costs, is the use of less expensive powders. However, this approach has narrow limits, because most powders do not have a sufficient "sintering window" to be safely processed. This means that stable process parameters are hard to find for these powders.

Another approach is to chemically limit powder aging. In this case, machines flushed with nitrogen are common in laser sintering, for example. This can prevent powder oxidation. However, for process-related reasons alone, aging cannot be curbed entirely, because part of the solidification reaction occurs by a secondary reaction of the polymer. Curbing this secondary reaction would mean essential limitations in strength.

One problem with known high-speed sintering methods is the adjustment of advantageous process conditions, such as, for example, the temperature windows with respect to the particulate materials used. The high-speed sintering method combines a great number of process parameters and the 3D printing machines used therein have a great number of constructive features and components, which makes it difficult to combine suitable components and adjust an advantageous or improved process sequence allowing improved process conditions. In many cases, it is impossible to determine what constructive changes are required in order to achieve acceptable process results and obtain high-quality 3D parts and/or optimise the process.

Another problem in adjusting the process conditions is to combine the process conditions such that, on the one hand, a sufficiently strong component is manufactured with desired and advantageous properties, while at the same time subjecting the particulate material that is not to solidify to process conditions enabling easy unpacking. One problem in this regard is that the surrounding material solidifies too much in the process and is therefore difficult to remove from the component requires increased effort to do so.

A further problem is the radiation characteristic of conventional IR radiators that can be installed for a high-speed sintering process 3D printing process.

The radiation characteristic of conventional IR radiators which operate thermally consists of a broad continuous spectrum of different wavelengths, whose distribution largely corresponds to Planck's radiation law. In order to achieve a sufficiently high power density and a long service life, short-wave quartz tube infrared radiators are generally used with a heating coil temperature of 2,400K and, thus, a peak wavelength of approx. 1.2 µm.

Although it is possible to carry out the sintering process with these radiators, the long-wave components included in the radiation spectrum lead to the unprinted powder heating up in an uncontrolled manner in the sense of the process, whereby this powder is also sintered to a certain degree. This is disadvantageous and undesirable as it reduces the quality of the printing process and the products manufactured and makes the particulate material that is not to be sintered less reusable.

The aim of selectively influencing both types of areas, i.e. the area not to solidify and the area to be sintered for the production of a 3D molded part or the printed and unprinted areas, respectively, can be achieved only to a limited degree.

Consequently, a compromise must be made between poor mechanical properties of the molded article as a result of insufficient energy input during the sintering process on the one hand and strong adhesion to the parts influencing their geometry as a result of excessive energy input on the other hand. In addition, the powder in narrow spaces between the molded articles can then no longer be removed.

The maximum achievable powder recycling rate drops drastically with high energy input, so that high costs arise due to the necessary addition of fresh powder.

This effect is aggravated by the fact that the high heating coil temperature of conventional short-wave IR radiators causes the quartz glass tube surrounding it to heat up. As a result, the latter reaches temperatures of up to 900K, itself becoming an emitter of long- to medium-wave IR radiation and thus a so-called "secondary radiator".

A solution to the problem of long-wave IR radiation using monochromatic emitters such as LEDs is very costly and complex due to the high power density required, hence not feasible in practice.

The use of special thermal near infrared radiators with a higher coil temperature or smaller peak wavelength and thus lower long-wave radiation components also makes high technical demands, such as sufficient cooling of the radiator tubes, especially at the coil feedthroughs. Furthermore, both solutions are currently not established on the market and are therefore difficult to obtain. The service life of near-infrared radiators is also greatly reduced compared to short-wave radiators due to the high wire temperature. The resulting additional costs are added to the high acquisition costs of the radiator units. This represents a further disadvantage of known devices for a high-speed sintering process.

The use of radiators with a tungsten-halogen cycle is not expedient due to the frequent switching on and off of the unit and the resulting short service life.

The printing of a kind of reflector liquid on the areas that are not to be sintered is possible according to the prior art, but cannot be implemented cost-effectively. Due to the low packing density of additive manufacturing processes of generally no more than 20%, this also means a high consumption of reflector liquid for wetting the remaining surface, which is reflected in high operating costs. In addition, twice the number of print heads is required.

Due to the radiation characteristic of the sintering lamp, inhomogeneities in the temperature distribution occur on the powder bed. These are due to the fact that the sintering lamp is not an ideal infinitely long radiator. This means that the energy input during the sintering pass is generally lower at the edges of the construction field than in the middle. This leads to lower interlaminar bonding of the molded article near the edges of the construction field. Although the effect can almost be eliminated by increasing the size of the sintering lamp, this contradicts the requirement for a compact design of the machine, which is advantageous for temperature control.

The process temperature is controlled according to the prior art by heating radiators above the construction field. These are preferably designed as long-wave to medium-wave infrared radiators, as they heat the particle material most effectively and have no selectivity with regard to the printed powder surface. Since the long-wave infrared radiation required as a result is associated with a low temperature, radiators of these wavelengths and performance data are designed in accordance with the prior art as thermal emitters. In this case, a well-emitting surface is usually heated via heat conduction by means of a resistance heater or a wire.

Due to the heat conduction of these emitting materials in the time range of a few minutes, they react only very slowly to a change in the control value.

Hence, the prior art, on the whole, does not allow completely separate control of the two temperatures relevant to the process. This means that stable process control and the associated constant mechanical properties of the 3D molded articles produced are virtually impossible during the entire construction process.

The lack of control of the entire process makes it difficult to process other non-PA12-based particulate materials such as material systems based on TPU (a urethane-based thermoplastic elastomer). The poor controllability of the temperature control currently results in a very limited development of new materials for known high-speed sintering processes (high-speed sintering 3D printing processes) and devices.

It was therefore an object of the present invention to reduce or altogether avoid the disadvantages of the prior art.

Another object of the present invention was to provide a device and/or a method to better control the two different temperatures or temperature windows or temperature ranges, i.e. the warm-up temperature range or basic temperature range or warm-up temperature or basic temperature on the one hand and the sintering temperature window or sintering temperature range or sintering temperature on the other hand.

Another object of the invention is to provide a method and a device allowing the heating of the "printed and unprinted" types of areas to be performed in a specific and low-cost manner.

DETAILED DESCRIPTION OF THE INVENTION

Figure 1:
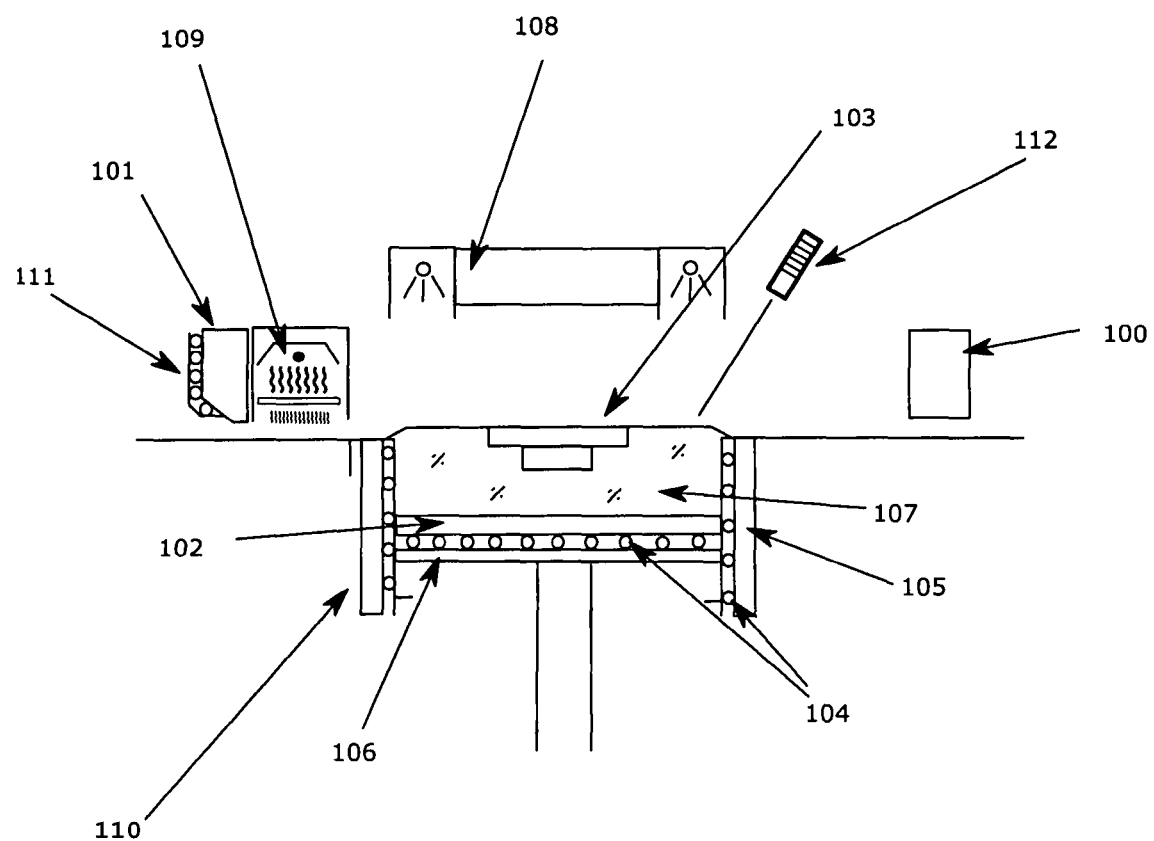
FIG. 1: Heating systems of an exemplary embodiment

Several terms according to the invention will be explained in more detail below.

A "molded article" or "part" in the sense of the invention means three-dimensional objects manufactured by means of the method according to the invention or/and the device according to the invention and exhibiting dimensional stability.

"Construction space" is the geometric location where the particulate material bed grows during the construction process by repeated coating with particulate material or through which the bed passes when applying continuous principles. The construction space is generally bounded by a bottom, i.e. the construction platform, by walls and an open top surface, i.e. the construction plane. In continuous principles, there usually is a conveyor belt and limiting side walls.

The "heating phase" refers to heating of the device at the beginning of the process. The heating phase is complete as soon as the required temperature of the device becomes stationary.

The "cooling phase" lasts at least until the temperature is so low that the parts are not subject to any significant plastic deformation when removing them from the construction space.

The "particulate materials" of use herein may be any materials known for powder-based 3D printing, in particular polymers, ceramics and metals. The particulate material is preferably a free-flowing powder when dry, but may also be a cohesive, cut-resistant powder or a particle-charged liquid. In this specification, particulate material and powder will be used synonymously.

The "particulate material application" is the process of generating a defined layer of powder. This may be done either on the construction platform or on an inclined plane relative to a conveyor belt in continuous principles. The particulate material application is also referred to herein as "coating" or "recoating".

"Selective liquid application" in the sense of the invention may be effected after each particulate material application or irregularly, depending on the requirements for the molded article and for optimization of the molded article production, e.g. several times with respect to particulate material application. In this case, a sectional image of the desired article is printed.

The "device" used for carrying out the method according to the invention may be any known 3D-printing device which includes the required parts. Common components include coater, construction field, means for moving the construction field or other components in continuous processes, metering devices and heating and irradiating means and other components which are known to the person skilled in the art and will therefore not be described in detail herein.

The "absorber" in the sense of this invention is a medium which can be processed by an inkjet print head or any other device working in a matrix-like manner, which medium enhances the absorption of radiation for local heating of the powder.

"Reflector liquid" is the term used for the antagonist of the absorber which, according to the prior art, is used to prevent particle materials from sintering.

"Absorption" refers to the uptake by the powder of thermal energy from radiation. The absorption depends on the type of powder and the wavelength of the radiation.

The "support" refers to the medium in which the actual absorber is present. This may be an oil, a solvent or generally a liquid.

"Radiation" in the sense of the invention is e.g. thermal radiation, IR radiation, microwave radiation and/or radiation in the visible or UV range. In one embodiment, heat radiation is used, e.g. generated by an IR radiator.

"Radiation-induced heating" as used herein means irradiation of the construction field by stationary or mobile sources of radiation. The absorber must be optimized for the type of radiation. This is intended to produce differences in heating between "activated" and "non-activated" powder.

"IR heating" as used herein specifically means irradiation of the construction field by an IR radiator. The radiator may be either static or movable over the construction field by a displacement unit. Using the absorber, the IR heating results in different temperature increases in the construction field.

"Radiation heating" generalizes the term "IR heating". The absorption of radiation of any wavelength may heat a solid or a liquid.

Area type is an expression used to differentiate between unprinted and printed areas.

An "IR radiator" is a source of infrared radiation. Usually, incandescent filaments in quartz or ceramic housings are used to generate the radiation. Depending on the materials used, different wavelengths result for the radiation. In addition, the wavelength of this type of radiator also depends on its power.

A "source of radiation" generally emits radiation of a specific wavelength or a specific wavelength range. A source of radiation with almost monochromatic radiation is referred to as a "monochromatic radiator". A source of radiation is also referred to as an "emitter".

An "overhead radiator" in the sense of the invention is a source of radiation mounted above the construction field. It is stationary, but has an adjustable radiant power. It essentially ensures non-selective surface heating.

The "sintering radiator" is a source of radiation which heats the printed process powder to above its sintering temperature. It may be stationary. In preferred embodiments, however, it is moved over the construction field. In the sense of this invention, the sintering radiator is embodied as a monochromatic radiator.

"Secondary radiator" means a radiator which, by passive heating, becomes itself an active emitter of radiation.

"Sintering" is the term for the partial coalescence of the particles in the powder. In this system, the build-up of strength is connected with the sintering.

The term "sintering window" refers to the difference in temperature between the melting point occurring when first heating the powder and the solidification point during the subsequent cooling.

The "sintering temperature" is the temperature at which the powder first begins to fuse and bond.

Below the "recrystallization temperature", powder once melted solidifies again and shrinks considerably.

The "packing density" describes the filling of the geometric space by solid matter. It depends on the nature of the particulate material and the application device and is an important initial parameter for the sintering process.

The term "shrinkage" refers to the process of geometric shortening of a dimension of a geometric body as a result of a physical process. As an example, the sintering of suboptimally packed powders is a process resulting in shrinkage with respect to the initial volume. Shrinkage can have a direction assigned to it.

"Deformation" occurs if the body is subject to uneven shrinkage in a physical process. Such deformation may be either reversible or irreversible. Deformation is often related to the global geometry of the component.

"Curling" as used in this specification refers to an effect resulting from the layer-wise approach of the described invention. This means that layers generated in quick succession are subject to different degrees of shrinkage. Due to physical effects, the compound then deforms in a direction which does not coincide with the direction of shrinkage.

The "grayscale value" refers to the amount of activator printed into the powder. According to the invention, different grayscale values can be printed onto the construction field in order to achieve different degrees of heating.

A "spectrum converter" in the sense of the invention is a means which absorbs radiation, e.g. electromagnetic heat radiation, and radiates or emits one or more defined wavelength ranges; in this case the spectrum converter is irradiated by an emitter of electromagnetic heat radiation (short-wave or long-wave radiation), i.e. by a lamp or a radiator, e.g. an overhead radiator or a sintering unit, and then emits a defined electromagnetic thermal radiation.

"Filter" or "filtering" in the sense of the invention means a blanking of parts of an electromagnetic radiation spectrum, where the desired electromagnetic radiation spectrum hits a target surface, e.g. a construction field surface.

"Temperature window" or "temperature range" in the sense of the invention means a defined temperature range below or within the sintering range of the particulate material used.

A "radiated spectrum of one or more wavelength ranges" in the sense of the invention corresponds to the radiated spectrum of the spectrum converter.

A "diffuser" in the sense of the invention is a means for scattering incident electromagnetic radiation, e.g. homogeneously or/and uniformly or/and independently of direction.

"Basic temperature" in the sense of the invention means the temperature to which the particulate material is heated and which is lower than the melting temperature and/or the sintering temperature.

The invention will be described in more detail below, where each of the aspects and characteristics of the invention can be combined with each other, even if this is not explicitly stated for each characteristic.

The object on which the application is based is achieved in accordance with the invention by a method of producing 3D molded parts, wherein particulate construction material is applied onto a construction field in a defined layer by means of a coater, one or more liquids or particulate material of one or more absorbers are selectively applied, an energy input is effected by means of radiators, the regions with selectively applied absorber selectively solidifying, the construction field being lowered by a layer thickness or the coater being raised by a layer thickness, and these steps being repeated until the desired 3D molded part is produced, characterized in that the method uses at least one spectrum converter.

The invention thus provides a method in which it is advantageous to be able to adjust the temperature windows of the recurring process steps more precisely. This in turn results in further significant improvements in procedure, product quality, the recycling rate of materials, ecological advantages and cost benefits.

In addition, the procedure is more gentle on the machines used and the components present in them. The heat development is also partly lower and in any case more precisely controllable. This also makes the method more energy-efficient.

In the method according to the invention, a spectrum converter can be used that is at least one filter which filters short-wave or long-wave radiation.

Further, in the method according to the invention, the filtered radiation range can be selected in such a way that it is compatible with the spectrum of the particulate material used. In this case, the filter is selected in such a way that the spectrum radiated onto the particle material preferably has a wavelength of 8-3.5 micrometers. The filter or filters can be selected in such a way here that the wavelengths of the radiation are optimized for the heating phase and/or the sintering phase and thus improved temperature windows are achieved at the material layer itself on the construction field.

Any material that is compatible with the process parameters can be used and applied in the method according to the invention. For example, a polyamide powder, a polyamide-based thermoplastic elastomer or a urethane-based thermoplastic elastomer can be used as the powder material. The filters and temperature windows can then be adapted accordingly in order to achieve an advantageous procedure and advantages for the product parameters and recycling rate, among other things.

For example, the method according to the invention is characterized in that the applied powder layer is heated in a first heating step to a basic temperature of the powder without the absorber, which is within the sintering window of the powder material, and a second sintering step leads to selective solidification, by heat input, of the areas printed with absorber, at a sintering temperature above the melting temperature of the powder, wherein the areas with the selectively applied absorber heat up more in the first step than the areas without absorber, and thus a temperature difference is set between areas with and without absorber.

Furthermore, the object is achieved according to the invention by a device suitable for producing 3D molded parts, comprising all the components necessary for a powder-based printing process, characterized in that it comprises at least one spectrum converter which preferably has cooling slots, cooling recesses, cooling grooves or/and cooling bores.

A device according to the invention achieves in an advantageous way that disadvantages of known devices and processes are reduced or can essentially be avoided.

With the device according to the invention it is possible to move the temperature windows into more defined areas and thus achieve more optimal temperature ranges with regard to the materials used. This offers further advantages in terms of the quality of intermediates and products. Furthermore, the recycling rate of the powder material can thus be increased, allowing to achieve i.a. a reduction in costs and thereby lower production costs.

A device according to the invention is characterized in that the spectrum converter is at least one filter that defines a selected wavelength range and filters that wavelength range.

Furthermore, all spectrum converters or filters suitable for the desired process conditions can be used, e.g. the filter is a borosilicate disk.

In one aspect of the invention, it is important that the selected wavelength range is selected from long-wave or short-wave infrared radiation, preferably in the wavelength range of 8 µm-3.5 µm or 3.5 µm-0.5 µm.

In the device according to the invention, the spectrum converters can be arranged in any suitable way. It may be advantageous, where at least two spectrum converters are essentially arranged one above the other, to preferably have a cavity between the at least two spectrum converters.

A device according to the invention has all parts necessary and known for a high-speed sintering process, which therefore need not be described in detail here. Parts suitable for the method according to the invention are components selected from the construction platform, side walls, job box, recoater, print head, ceramic sheet, energy input means, preferably at least one radiator, preferably an overhead radiator or/and a sintering radiator unit.

As explained above, an essential aspect of the present invention is to control the wavelength ranges or the temperature windows of the process and to carry out the printing process in defined areas.

It is therefore advantageous that the overhead radiator radiates a wavelength range of 8-3.5 µm or/and the sintering radiator unit, preferably including filter(s), radiates a wavelength range of 3.5-0.5 µm, which is radiated onto the particle material and/or the construction surface.

Furthermore, it may be advantageous if the device according to the invention is characterized in that it further comprises one or more components selected from the group comprising a fluid-cooled radiator, a fan, an insulation of the construction container, an insulation of the construction platform, a resistance heater, a heating coil, a resistance heater of the coater, a pyrometer, a diffuser and an infrared radiator.

Further aspects of the invention will be set forth below.

In general, the object is achieved by using radiation sources as sintering radiators which correspond to conventional, low-cost IR or drying radiators, but whose part of the long-wave IR spectrum is kept away from the powder surface by means of a filter inserted in the beam path. These filters can be special glasses with suitable absorption characteristics. It is also possible to filter by means of non-solid substances such as a liquid or gas layer.

The absorbed radiant energy not transmitted can be cooled away without great effort, since an air flow onto the powder surface is prevented, which would cool it down and interrupt the sintering process. The larger area compared to the tube of a near infrared radiator favors the effectiveness of air cooling, which can therefore be carried out very simply, technology-wise, and cost-effectively. For smaller designs, it is sufficient to make use of the convective air movements so that these can do entirely without an electrically operated unit, such as a motor fan.

It is also possible to use two or more filters positioned one behind the other. This further increases the effective cooling surface. An equally achievable improvement in the filter characteristic enables an economical design.

Filters based on a non-solid material can equally correspond to filter and cooling media.

The removal of long-wave infrared radiation has many other advantages. For instance, it increases the selection of materials which are transparent for said radiation. This includes commercially available materials which can be used as diffusers so as to maximize the uniformity of radiation. This makes it possible to reduce the size of the sintering lamp and thus of the process chamber, which benefits a simpler temperature control of the process.

Illumination with higher radiation intensity is thus accessible, which increases the bond of the individual surfaces partially melted in the layer build-up process. This improves the strength of the molds to be produced. Using the described sources of radiation allows to reduce not only the distance between the radiator and the respective area, but also the size of the radiator, so that more compact machine geometries are feasible and the energy efficiency can be considerably increased.

Since the usable radiator output is decoupled from the emission of long-wave radiation, the power output of the device can be increased without any problem. The process itself remains virtually unaffected. This makes it possible to increase the process speed.

Conversely, a decoupling of wavelength and radiator temperature can be used for the overhead units.

By means of short-wave radiators, a body introduced into the beam path can be heated in a planar manner so that the latter itself is stimulated to emit radiation in the long-wave range.

If the planar body is sufficiently thin and the absolute heat capacity is thus kept low, abrupt changes in the energy content of the powder cake, e.g. when printing large-area molded articles, can be reacted to at a sufficient speed to produce the three-dimensional molded article in an economically sensible time span of a few hours, since there is no need to pause per printed layer to give the radiators time to adjust the temperature of the powder surface by adjusting the power output.

Examples

Brief Description of the Means Used and their Effects

The key object of specifically heating the respective types of areas is achieved by the use of short-wave IR radiators with a radiation filter.

The prior art method consists of the steps of layering, printing, exposure to radiation and lowering. The first step is analogous to the layering in known powder-based 3D printing. Powder is placed in front of a blade, applied onto a construction platform and smoothened by the blade. In this case, the layer thickness determines the positions of the construction platform in two successive coating operations.

Next, the layer is printed. In the method mentioned here, liquids are applied by an inkjet print head. Part of the liquid is an absorber which causes local heating of the powder upon exposure to radiation.

The layer thus printed is then scanned by a radiation source and thereby selectively heated. When a thermal source of radiation is used without a filter, the entire powder is heated strongly. However, the temperature increases particularly in activated areas such that the particles begin to sinter. Using radiators with filters, this process can be better controlled and the respective types of areas can be acted upon specifically.

After this step, the construction field is lowered by one layer thickness. All of the above-mentioned steps are then repeated until the desired part is obtained.

The construction field or the unprinted areas are maintained at a temperature near the sintering temperature. On the one hand, the additional energy for sintering the powder is then low and can be introduced by gently acting means. On the other hand, the temperature surrounding the part is so high that the temperature does not drop below the recrystallization temperature, even in the peripheral areas of the part, as the construction process progresses and, consequently, does not disrupt layering.

In addition to the source of radiation scanning the construction field, an additional, stationary source of radiation may be optionally present above the construction field. The additional source of radiation acts whenever the construction field is not covered by a unit, such as the coater or the print head. This overhead radiator, as it is called, is preferably controlled so as to set a constant temperature on the construction field. For example, a pyrometer sensor may be used to determine the actual temperature. In such an arrangement, the overhead radiator constitutes the central temperature control component.

The overhead radiator performs the function of controlling the process temperature. However, such control may also be achieved by the sintering radiator. In this case, radiators adapted for heating unprinted areas must be used and their power controlled according to the requirements of the process. Also, the printed areas necessary for sintering and low-shrinkage construction must be heated by radiation.

Without control via the overhead radiator, the processes of printing and coating can be performed sequentially virtually without any delay.

This method also allows static radiation panels to be implemented, which combine the functions of the overhead radiator and the sintering radiator. If a geometric movement of the radiation intensity makes sense geometrically, said radiators may be assembled from switchable sections. For example, radiators can be deactivated in some sections in order, for example, to protect sensitive components such as the print head during its movement.

The shielding from long-wave infrared radiation and the improved cooling provided by the now cost-efficient construction of closed units lead to lower temperatures in the device. This is advantageous for protecting sensitive components.

Further Exemplary Embodiments of the Invention

General, Detailed Description of the Device

The device required in order to carry out the invention is closely modeled on a 3D printer for powder-based printing. In addition, further process units are used for temperature control and imprinting of the process liquids.

At the beginning of the process, the entire device is heated up. For this purpose, all heating elements are used to increase the temperature. The heating phase is complete as soon as the temperature remains constant in all measurement locations of the system.

The individual heating systems of a preferred embodiment of the invention will be described below in accordance with FIG. 1:

The construction platform (102), on which the particulate material is deposited in the process and by which the layer thickness of the layers (107) is adjusted, can be heated by various systems. A preferred embodiment uses an electric resistance heater (104). Also preferably, the latter is provided as a planar heating film, based on considerations of a homogeneous heating effect. The effect of this heating is registered and controlled by a sensor. The sensor is connected directly with the construction platform. Conveniently, the construction platform itself is made of metal, preferably aluminum. An insulation (106) covers the construction platform (102) downwardly.

The construction platform may also be heated by a fluid. For this purpose, heating coils (104) are installed below the preferably metallic construction platform. Further below, an insulation (106) is disposed in order to homogenize the heating effect.

A heat transfer oil, for example, flows through the heating coils. Preselecting the oil temperature allows exact temperature adjustment. Very high-quality temperature control can be achieved by ensuring a sufficiently high flow rate and adjusting the power.

The construction platform (102) is moved in the construction container (110) as it is called. Depending on the design of the device, the container may be removable from the device. In this manner, great temporal machine efficiency can be achieved, as a second construction container can be used in the device while unpacking the parts.

The construction container (110) is also heated. The same techniques can be used for the construction platform. The container itself is preferably made of metal again, preferably of aluminum to ensure good heat conduction. The actual active heating (104) is in turn backed by an insulation (105). This allows the effect to be enhanced, while increasing homogeneity.

A plug-in system is preferably arranged between the device and the construction container for power connection. This may include an electrical connection or a connector for liquids.

The next essential heating system of a device according to the invention is the overhead radiator (108). According to the invention, the overhead radiator (108) is preferably disposed above the construction field and irradiates the construction field perpendicularly. Also preferred are laterally mounted radiators which irradiate the construction field at a certain angle. Such a construction is preferred in order to minimize the shading effect of the coater or the print head.

According to the invention, the overhead radiator (108) may be equipped with thermal radiators, which should have minimum selectivity. For example, ceramic radiators with an extremely large wavelength may be used. The use of so-called medium wave quartz-tungsten radiators is also conceivable. The specific heating of the different types of areas is then effected by the sintering radiator (109).

It is favorable for the method to operate the overhead radiator (108) in a controlled manner. For this purpose, the use of a pyrometer (112) as the sensor may be preferred. The pyrometer is directed towards a peripheral area of the construction field, which the control system ensures is not a region printed with absorber.

Figure 2A:
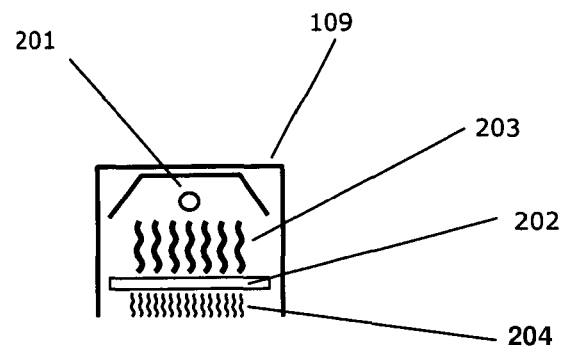
FIG. 2: Exemplary embodiment of a sintering lamp with a filter element a) in front, several filter elements b), with cooling c) or with diffuser d)
Figure 2B:
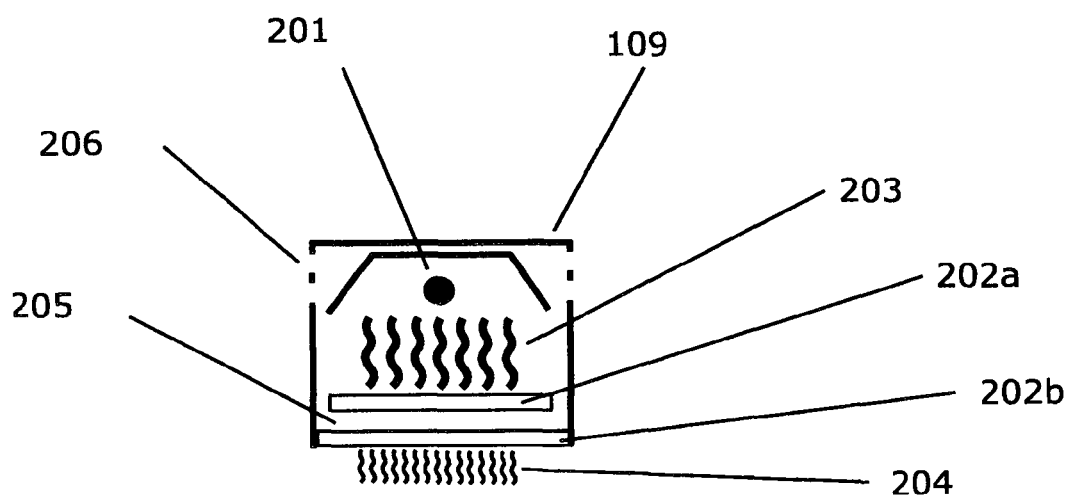

In a preferred embodiment of the invention, the actual sintering is carried out by a sintering radiator (109) carried along with the coater. Said radiator heats the construction field as it passes over the latter. The radiator may be used to heat the freshly printed powder or an already covered powder layer. According to the invention and as shown in FIG. 2a, a short-wave radiation source (201) with an upstream filter (202) is used here, which, as an option according to the invention, can also have several filters. A nested design of several filters (202) spaced apart (205) is preferred to ensure cooling of the filters as shown in FIG. 2b.

In a preferred embodiment of the device, the powder is preheated before application onto the already existing powder surface so as to prevent excessive cooling of the layer. An electric resistance heater (111) in the coater (101) is also suitable to preheat the powder.

In principle, all units heated by contact heaters can also be heated indirectly by infrared radiation. It may be particularly advantageous to heat the coater with radiation if strong vibrations are required in the device due to the powder used.

Figure 3:
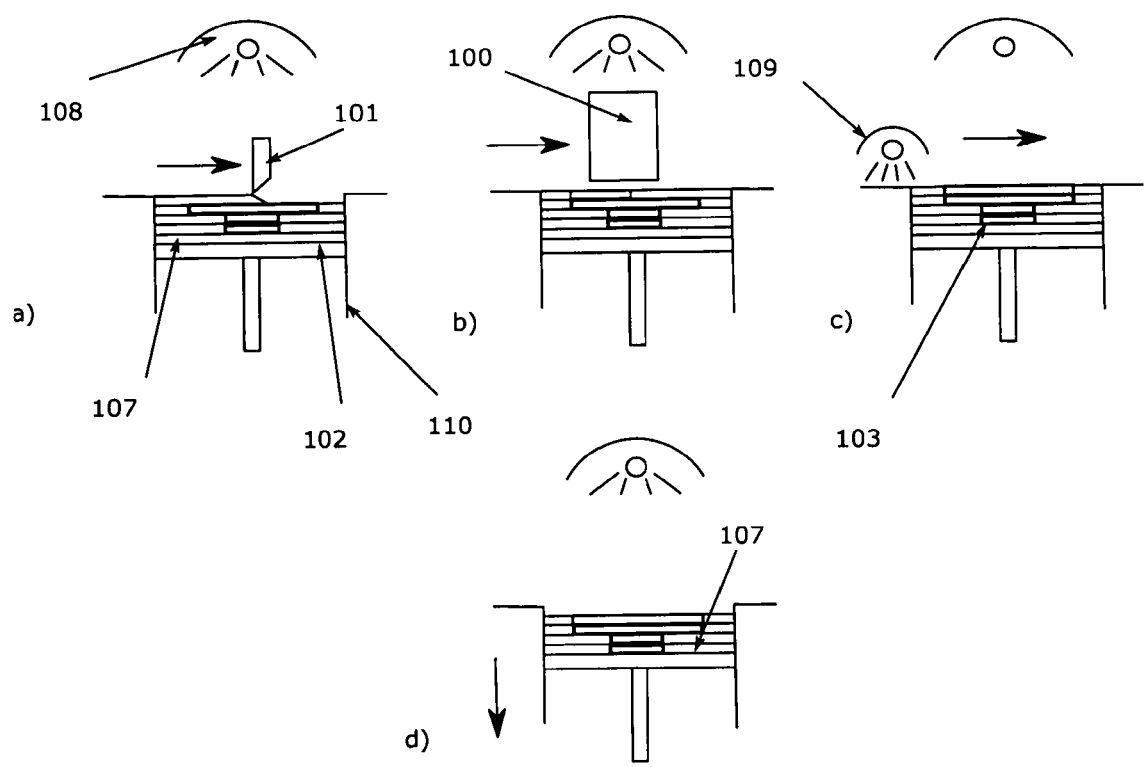
FIG. 3: Sequence of a process according to the invention

Preferably, the following sequence of process steps is carried out by the device after the heating phase: A powder layer is formed by the coater (101) on the construction platform (FIG. 3a). Optionally, depending on the design of the machine, the new layer can be additionally heated by the sintering radiator (109). Next, this layer is printed on by one (100) or several inkjet print heads (100) (FIG. 3b). Now, the printed layer is heated by the sintering lamp (109) and then covered with powder again (FIG. 3c). Then, the construction platform (102) is lowered (FIG. 3d).

This operation is repeated until completion of the parts (103) in the construction container (110). Then the cooling phase follows. This phase preferably takes place in the construction container which is then supplied with energy outside the device.

Figure 4:
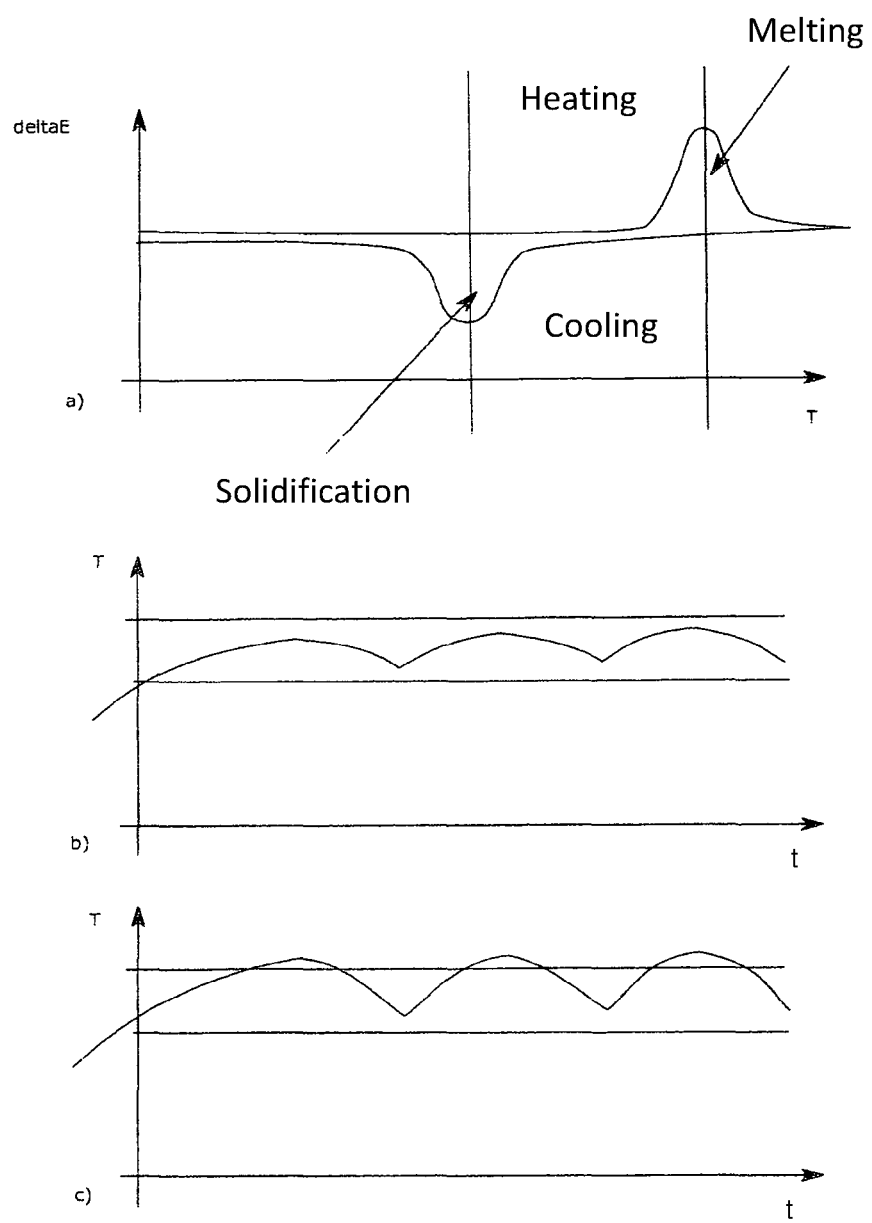
FIG. 4: a) Schematic energy input and output curves of a powder such as polyamide 12; b) temperature curves showing liquidus and solidus temperatures of the unprinted area type; c) temperature curves showing liquidus and solidus temperatures of the printed area type.

FIG. 4 shows temperature diagrams. FIG. 4a schematically depicts the profile of the energy emitted by the powder when it is heated and cooled again in one cycle. During heating, significant absorption of energy occurs at a certain temperature. This is where melting or sintering of the material occurs (sintering temperature). For polyamide 12, which is suitable for laser sintering, this temperature is approx. 185° C. During cooling, there is also a significant point considerably below the sintering temperature (recrystallization temperature). This is where the molten material solidifies.

FIGS. 4b and 4c show the temperature profile during a process run according to a prior art method. FIG. 4b shows the temperature profile in the unprinted area. Using the sintering radiation source produces heating and cooling phases in the otherwise constant profile. In the unprinted area, the temperature never reaches the sintering temperature.

FIG. 4c shows the profile in the printed area. Here, the variations are more marked. The process is controlled at least such that the sintering temperature is briefly exceeded, so that part of the powder is melted and remains molten. Excessive heating may cause all of the powder to melt in this area, resulting in massive warping. Excessive cooling of the printed area must also be avoided, because otherwise recrystallization will start, and then all shrinkages due to the now possible power transmission will lead to geometric distortion (warping or curling), which may make the further process impossible.

Staying precisely within this "process window" between the melting temperature and the recrystallization temperature is decisive for the quality of the parts. In this context, different boundary conditions apply to the printed and unprinted areas. The use of filtered short-wave IR radiation sources facilitates temperature control between both temperatures considerably.

In particular, the exemplary embodiments describe how to use the advantages of these sources of radiation in the described process.

Further Exemplary Embodiments

Example 1: Device Comprising a Sintering Lamp which Includes Short-Wave IR Radiators with a Radiation Filter, and a Thermal Overhead Lamp According to FIG. 3a, the construction process or process cycle begins with the coating of one powder layer with a layer thickness of 100 µm, for example, onto the construction platform. The powder is heated by the overhead radiator (108) already during the coating process performed by the coater (101), unless optically masked by the coater (101) or the print head (100). When using PA12, in this case PA2200 from manufacturer EOS, the powder is heated to 168° C. The sintering radiator (109), which only provides radiation resulting in good heating of the printed area, is not activated in this step.

The overhead radiator (108) includes a measuring device designed to control the surface temperature of the construction field. Ideally, the measuring device is embodied as a miniature pyrometer (112) which can determine the temperature in a contactless manner. The control has to make allowance for the fact that the measuring device is masked time and again by the print head (100) and the coater (101). This may be done by deactivating the measurement function or by using insensitive control loop parameters.

In a second step, the absorber, for example carbon black, is applied by the print head (100) which is adjusted precisely to the wavelength of the source of radiation. The image applied by the print head (100) onto the particulate material corresponds to the cross-section of the current molded article.

The third step is the sintering pass. For this purpose, the source of radiation of the sintering radiator unit (109) is activated and passed over the construction field. The power of the source of radiation and its speed determine the radiation power on the construction field. In contrast to the prior art, the sintering radiator (109) with a radiation filter, e.g. made of borosilicate glass of a thickness of 2 mm from manufacturer GVB GmbH, does not heat unprinted areas during this pass. Thus, the temperature of the printed areas increases while unprinted areas are not affected. The long-wave part of the radiation emitted by the radiation source, which approaches the wavelength distribution of a black body and has a peak wavelength of 1.2 µm, is absorbed by the radiation filter from a wavelength of 3 µm.

The fourth step is the lowering of the construction platform (102) by the thickness of one powder layer (107). During this process, the construction field is open to the overhead radiator (108), allowing temperature readjustment. After this, the process cycle starts over with the coating process.

FIG. 1 describes a device for implementing the process mentioned in the example. The overhead radiator (108) is embodied as a long- to medium-wave thermal source of radiation. The temperature of the construction container bottom and the construction platform is controlled by resistance heaters (104). In the device serving as an example the coater (101) and the sintering radiator unit (109) are connected. This unit and the print head (100) can be moved separately over the construction field, but they don't have to.

The sintered radiator (109) is equipped with a short-wave radiator (201) and an upstream filter (202) as shown in FIG. 2a. The long-wave components (203) generated by the short-wave emitter are absorbed by the filter, so that only short-wave components can reach the powder surface (204).

Example 2: Device of a Sintering Lamp, Provided with a Cooling Function

Figure 2C:
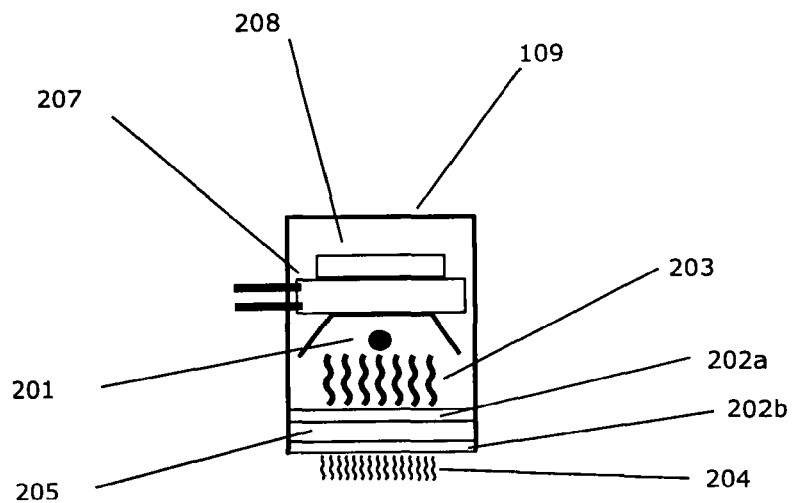

FIG. 2b and FIG. 2c show an embodiment of the sintering lamp with integrated cooling. The radiation filters are schematically shown in duplicate (202a, 202b) by way of example. Both elements are not in contact, but are arranged with a certain distance (205) between them. In this design, most of the long-wave infrared radiation generated is absorbed by the filter (202a) which is closest to the short-wave radiator (201). The latter is heated by the long-wave infrared radiation, but allows the short-wave radiation to pass through. Thus, the second filter (202b), which faces the particle surface according to FIG. 1, is not heated by this long-wave thermal radiation. The second filter also leaves the short-wave radiation unaffected, so that it can be used to heat the area of the particle material wetted by the print head (100) to a temperature above its melting temperature. The now much lower temperatures of the second filter prevent particle material whirled up by the coating process (FIG. 3a) from melting and sticking to the filter's surface, which would block the radiation flow.

The first filter (202a) can be cooled convectively (FIG. 2b) by means of openings in the housing of the unit (206) or by means of a cooling unit (FIG. 2c). A design with a cooling unit is suitable for larger designs of the sintering lamp. In this case, (207) denotes a cooling element through which a cooling fluid, preferably water, flows. A fan (208) arranged on the cooling element provides convection in the unit. In this embodiment, the first filter (202a) terminates in the housing wall of the unit.

Figure 2D:
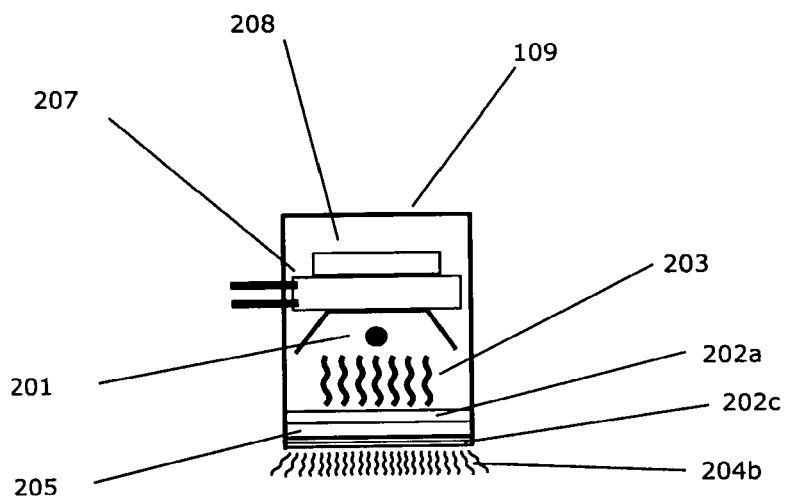

Example 3: Device of a Sintering Lamp, Provided with a Cooling Function and a Diffuser As indicated in FIG. 2d, a design of the filter (202b) described in Example 2 as a diffuser (202c) makes sense in order to uniformly irradiate the entire surface of the particulate material on the construction platform when the sintering lamp passes over it (204b). This ensures that a sufficiently high strength of the molded article to be produced can also be achieved in the edge regions of the construction platform. In this example, cryolite glass, white opal glass from manufacturer Edmund Optics, is suitable as a diffuser.

Figure 5:
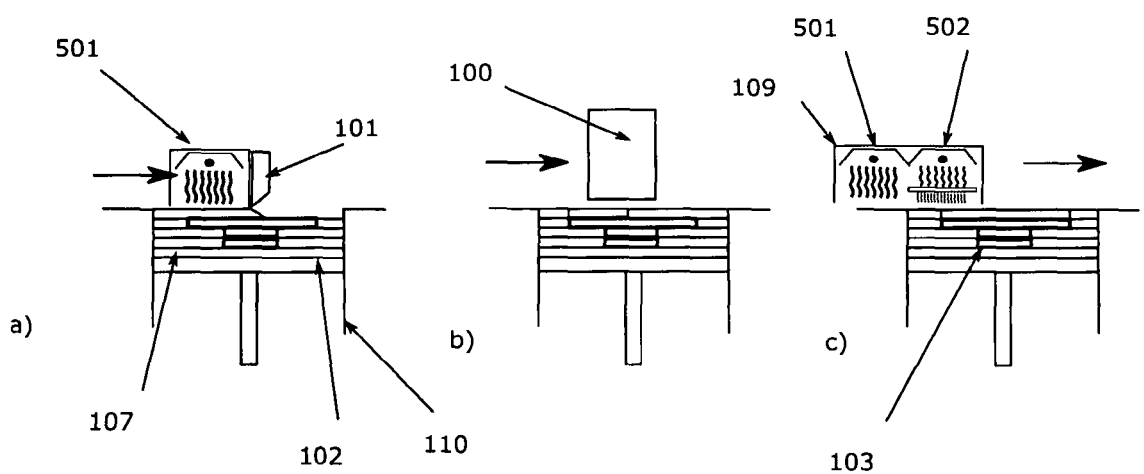
FIG. 5: Embodiment of the sintering lamp with two different radiator designs.

Example 4: Device of a Sintering Lamp, Provided with Two Short-Wave Radiators, with and without Radiation Filter, Respectively According to FIG. 5, the construction process or process cycle begins with the coating of one powder layer onto the construction platform (102). The sintering radiator without filter (501) of the unit (109), which also provides radiation resulting in good heating of the unprinted area, is activated in this step and heats the powder to a basic temperature below the melting temperature but above the recrystallization temperature of the powder. The energy supply for this is controlled by the power and the traversing speed. Favourably, the temperature generated is measured and adjusted.

In a second step, the absorber is applied which is adjusted precisely to the wavelengths of the source of radiation (502) for the printed areas which are allowed to pass through the filter. The image applied by the print head (100) onto the powder corresponds to the current molded article's cross-section.

The third step is the sintering pass. For this purpose, the sintering unit (109) is activated and passed over the construction field. The power of the source of radiation and its speed determine the radiation power on the powder bed. In contrast to the prior art, the unit having two spectra (501, 502) can specifically influence unprinted and printed areas during this pass. Thus, the temperature of the printed areas increases while the energy loss by radiation in the unprinted areas can be compensated for.

The fourth step is the lowering of the construction platform (102) by one layer thickness and is kept extremely short in this exemplary process. There is no adjustment here and any delay leads to energy loss by thermal radiation. Therefore, this step is not shown in the drawing.

An overhead radiator can be dispensed with if the process cycle is executed sufficiently quickly.

Figure 6:
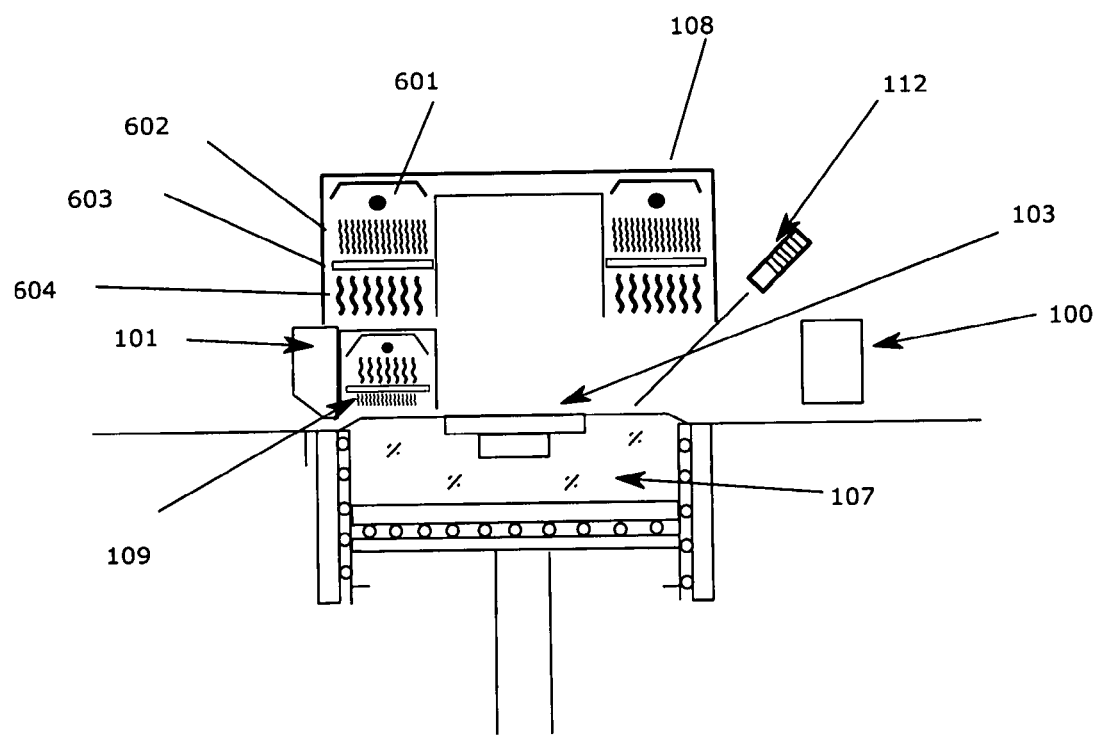
FIG. 6: Overhead radiator embodied by combining a short-wave infrared radiator and a spectrum converter in the beam path
Figure 7A:
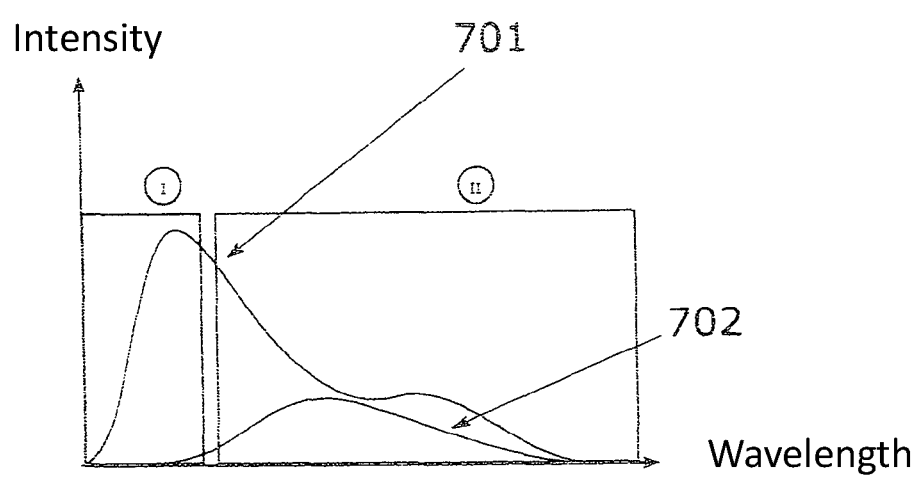
FIG. 7: Radiation spectra, a) overlapping of long-wave and short-wave radiation with absorption range of powder (II) and absorber (I) in the case of a sintering unit embodied without filter, b) with filter; the shaded area represents the radiation energy absorbed by the absorber.
Figure 7B:
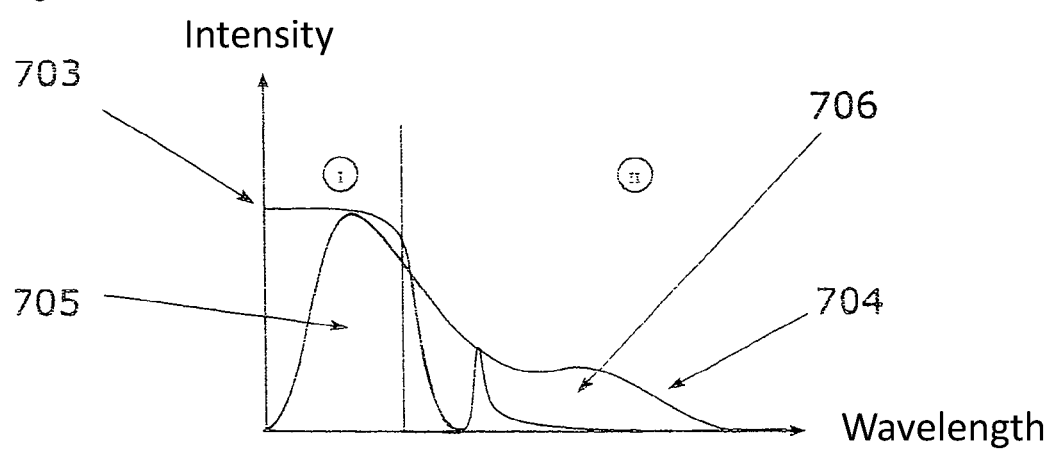

Example 5: Device of an Overhead Lamp, Provided with Short-Wave Radiators and an Absorber Surface According to FIG. 6, the overhead lamp (108) is designed using short-wave radiators with peak wavelengths of around 1.2 µm (601), which heat the surface of an absorber (603) located in the beam path (602) between the IR emitter and the powder surface. The absorber (603) itself emits infrared radiation (604), but in a substantially longer wavelength spectrum, preferably with peak wavelengths around 4 µm. The absorber is designed to be as thin as possible, a few millimeters thick, in order to keep the heat capacity of the material small and thus minimize the reaction time of the long-wave radiation emitted. Alunite, a non-oxide ceramic made of aluminum nitride from manufacturer Ceramtec, is the preferred material as it has a high thermal conductivity of approx. 200 W/mK and thus allows a fast reaction time during construction.

LIST OF REFERENCE NUMERALS 100 print head
101 coater
102 construction platform
103 parts
107 layers
108 overhead radiator
109 sintering radiator unit
110 construction container
105 insulation for construction container
104 resistance heater or heating coil
106 downward insulation of construction platform
111 resistance heater for coater
112 pyrometer
201 short-wave IR radiator
202 filter
202a filter, next to the short-wave infrared radiator
202b filter, next to the construction surface
202c diffuser 203 infrared radiation with long-wave components
204 infrared radiation without long-wave components
204b infrared radiation without long-wave components, undirected
205 cavity between two radiation filters
206 cooling slots
207 fluid-cooled radiator
208 fan
501 sintering radiator without radiation filter
502 sintering radiator embodied with a radiation filter
601 short-wave infrared radiator
602 broadband infrared radiation
603 absorber
604 long-wave infrared radiation emitted by the absorber
701 typical radiation spectrum of conventional radiators with secondary peak
702 spectrum of conventional radiators at lower power
703 absorption spectrum of borosilicate glass disk
704 emitted spectrum of conventional radiators at high power
705 transmitted spectrum
706 blocked wavelength range

What is claimed is:

1. A method of producing a 3D molded part, wherein particulate construction material is applied onto a construction field in a defined layer by means of a coater, one or more liquids or particulate material of an absorber are selectively applied in regions of the particulate construction material, and an energy input is effected into the particulate construction material by means of an infrared radiator passing over the construction field, the regions with selectively applied absorber being selectively fused by the energy input, the construction field being lowered by a layer thickness or the coater being raised by a layer thickness after the energy input, and these steps of applying particulate construction material, selectively applying absorber, effecting an energy input, and lowering the construction field or raising the coater being repeated until the 3D molded part is produced, characterized in that the method uses at least one spectrum converter arranged between the radiator and the construction field, the at least one spectrum converter comprising upstream and downstream radiation filters, the upstream filter being heated by long-wave thermal radiation generated by the radiator, and the downstream filter having a much lower temperature than the upstream filter so as to prevent particulate construction material whirled up by the coating process from melting and sticking to a surface of the downstream filter, the downstream filter leaving short-wave radiation generated by the radiator unaffected so as to produce the energy input.

2. The method according to claim 1, characterized in that the filters define selected wavelength ranges and filter those wavelength ranges.

3. The method according to claim 2, characterized in that the filtered ranges are selected such that the energy input is compatible with the particulate construction material used.

4. The method according to claim 1, characterized in that the applied layer is heated in a first heating step to a basic temperature without the absorber, the basic temperature being within a sintering window of the particulate construction material, and is heated in a second heating step to sinter the particulate construction material by said selective fusing, said sintering performed by heat input of the regions selectively applied with the absorber, at a sintering temperature above the melting temperature of the particulate construction material, wherein the regions with the selectively applied absorber heat up more areas thereof without absorber such that a temperature difference is set between regions of the particulate construction material with and without the absorber.

5. The method of claim 1, wherein the at least one spectrum converter includes the upstream radiation filter and the downstream filter spaced apart from one another.

6. The method of claim 5, wherein the upstream filter filters radiation generated by the radiator so that the downstream filter has a lower temperature than the upstream filter.

7. The method of claim 5, wherein the upstream radiation filter is cooled convectively or by means of a cooling unit.

8. The method of 1, wherein the upstream filter is heated by the absorbed long-wave radiation and allows short-wave infrared radiation generated by the radiator to pass therethrough.

9. The method of claim 1, wherein the 3D molded part is constructed in a job box and/or on a construction platform.

10. The method of claim 9, wherein the 3D molded part is constructed on an insulated construction platform.

11. The method of claim 9, wherein the method includes heating the construction platform or a wall of the job box.

12. The method of claim 1, wherein an overhead radiator is used to apply energy to the construction field.

13. The method of claim 12, wherein the particulate construction material is a polyamide powder, a polyamide-based thermoplastic elastomer, or a urethane-based thermoplastic elastomer.

14. The method of claim 1, wherein an overhead radiator radiates energy at a wavelength range of 8-3.5 µm to the construction field, or a sintering radiator unit radiates energy at a wavelength range of 3.5-0.5 µm to the construction field.

15. The method of claim 1, wherein the particulate construction material is a polyamide powder, a polyamide-based thermoplastic elastomer, or a urethane-based thermoplastic elastomer.

16. The method of claim 1, wherein the at least one spectrum converter comprises a filter in the form of a borosilicate disk.

17. The method of claim 1, wherein the at least one spectrum converter includes the upstream and downstream filters arranged essentially one above the other;
optionally wherein a cavity is defined between the upstream and downstream filters; and
optionally wherein the particulate construction material is a polyamide powder, a polyamide-based thermoplastic elastomer, or a urethane-based thermoplastic elastomer.

18. A method of producing a 3D molded part comprising the steps of:
applying a particulate construction material onto a construction field in a defined layer;
selectively applying one or more liquids or particulate material of an absorber onto the construction field in regions of the particulate construction material; and
effecting an energy input into the particulate construction material in the form of infrared radiation, wherein the regions with the selectively applied absorber are selectively fused;
wherein these steps of applying particulate construction material, selectively applying absorber, and effecting an energy input are repeated until the 3D molded part is produced; and
wherein the method includes passing the radiation through at least one spectrum converter having an upstream filter and a downstream filter spaced from one another, the at least one spectrum converter passing over the construction field for said effecting of energy input, wherein a temperature of the downstream filter is lower than a temperature of the upstream filter due to the upstream filter absorbing long-wave infrared radiation not absorbed by the downstream filter during said effecting of energy input;

optionally wherein the downstream filter is a diffuser.

19. A method of producing a 3D molded part comprising the steps of:
applying a particulate construction material onto a construction field in a defined layer;
selectively applying one or more liquids or particulate material of an absorber onto the construction field in regions of the particulate construction material; and
effecting an energy input into the particulate construction material in the form of infrared radiation by means of an infrared radiator, wherein the regions with the selectively applied absorber are selectively fused;
wherein these steps of applying particulate construction material, selectively applying absorber, and effecting an energy input are repeated until the 3D molded part is produced;
wherein the method includes passing the radiation through at least one spectrum converter passing over the construction field for said effecting of energy input and including spaced upstream and downstream radiation filters;
wherein the particulate construction material includes particles of a polymer;
wherein the method comprises cooling at least the infrared radiator with a fluid or an air flow, wherein contact of the air flow onto a surface of the particulate construction material is prevented; and
wherein the cooling prevents melting and sticking of the particulate construction material on a surface of the downstream filter.

* * * * *